United States Patent [19]
Banitt

[11] Patent Number: 5,963,247
[45] Date of Patent: Oct. 5, 1999

[54] VISUAL DISPLAY SYSTEMS AND A SYSTEM FOR PRODUCING RECORDINGS FOR VISUALIZATION THEREON AND METHODS THEREFOR

[76] Inventor: Shmuel Banitt, P.O.B. 1505, Beit Yonnaii, Israel, 40293

[21] Appl. No.: 08/760,514

[22] Filed: Dec. 5, 1996

Related U.S. Application Data

[63] Continuation-in-part of application No. 08/669,338, Jul. 2, 1996, which is a continuation-in-part of application No. 08/251,417, May 31, 1994, abandoned.

[30] Foreign Application Priority Data

May 31, 1995 [WO] WIPO ............... PCT/US95/06700

[51] Int. Cl.$^6$ ........................................ H04N 7/18
[52] U.S. Cl. ................................. 348/121; 348/42
[58] Field of Search .......................... 348/36, 38, 44, 348/121, 39, 42, 43, 51, 52, 123; 345/1, 6; 353/7, 10, 94; 434/43, 44; H04N 7/18

[56] References Cited

U.S. PATENT DOCUMENTS

| | | | |
|---|---|---|---|
| 2,468,046 | 4/1949 | de los Monteros | 88/16.6 |
| 3,492,419 | 1/1970 | Bartonik | 178/6.8 |
| 3,514,871 | 6/1970 | Tucker | 35/12 |
| 3,560,644 | 2/1971 | Petrocelli et al. | 178/6.8 |
| 3,580,978 | 5/1971 | Ebeling | 35/10.2 |
| 3,582,961 | 6/1971 | Shindo | 178/6.5 |
| 3,699,244 | 10/1972 | Cohen et al. | 178/5.4 R |
| 3,814,513 | 6/1974 | Nims et al. | 353/7 |
| 3,820,873 | 6/1974 | Redington et al. | 350/125 |
| 4,000,367 | 12/1976 | Field | 358/255 |
| 4,130,832 | 12/1978 | Sher | 358/89 |
| 4,154,514 | 5/1979 | Harvey | 352/69 |
| 4,195,911 | 4/1980 | Bougon et al. | 350/171 |
| 4,420,230 | 12/1983 | McElveen | 352/43 |
| 4,651,219 | 3/1987 | Rickert | 358/254 |
| 4,657,512 | 4/1987 | Mecklenborg . | |
| 4,714,319 | 12/1987 | Zeevi et al. | 350/144 |
| 4,868,682 | 9/1989 | Shimizu et al. | 358/335 |
| 4,941,041 | 7/1990 | Kenyon | 358/89 |
| 5,184,956 | 2/1993 | Langlais et al. | 434/69 |
| 5,187,586 | 2/1993 | Johnson | 358/254 |
| 5,225,861 | 7/1993 | Marks | 353/7 |
| 5,274,405 | 12/1993 | Webster | 351/158 |
| 5,345,249 | 9/1994 | Biemans | 345/1 |
| 5,361,078 | 11/1994 | Caine | 345/1 |
| 5,444,478 | 8/1995 | Lelong et al. | 348/38 |
| 5,454,075 | 9/1995 | Kudo | 345/1 |
| 5,487,665 | 1/1996 | Lechner et al. . | |
| 5,502,481 | 3/1996 | Dentinger et al. . | |
| 5,523,769 | 6/1996 | Lauer et al. | 345/1 |
| 5,746,599 | 5/1998 | Lechner . | |

FOREIGN PATENT DOCUMENTS

| | | |
|---|---|---|
| 0 605 045 A 1 | 7/1994 | European Pat. Off. . |
| 2 604 586 | 9/1986 | France . |
| 2 142 502 | 1/1985 | United Kingdom . |

OTHER PUBLICATIONS

Book: George Walberg, *Digital Image Warping*, IEEE Computer Society (1990).
Article: Irani et al., "Computing Occluding and Transparent Motions", International Journal of Computer Vision (1993).
Article: Irani et al., "Detecting and Tracking Multiple Moving Objects Using Temporal Integration", European Conference on Computer Vision, 1992.

*Primary Examiner*—Richard Lee
*Attorney, Agent, or Firm*—Lerner, David, Littenberg, Krumholz & Mentlik, LLP

[57] ABSTRACT

A method for generating a composite, three-dimensional-like image sequences, by the assembly of two or more separate image sequences is provided. The method comprises the steps of providing a main sequence of images; providing at least one secondary sequence of images, the contents of which are at least roughly related to the contents of the main sequence; selecting the positioned relationship of each of the secondary of images and main sequence of images; processing each of the secondary sequence of images so as to optimize its matching with the main sequence in the selected positioned relationship with it and displaying the main and secondary sequences of images at the same time and in substantially the same selected and positioned relationship.

14 Claims, 12 Drawing Sheets

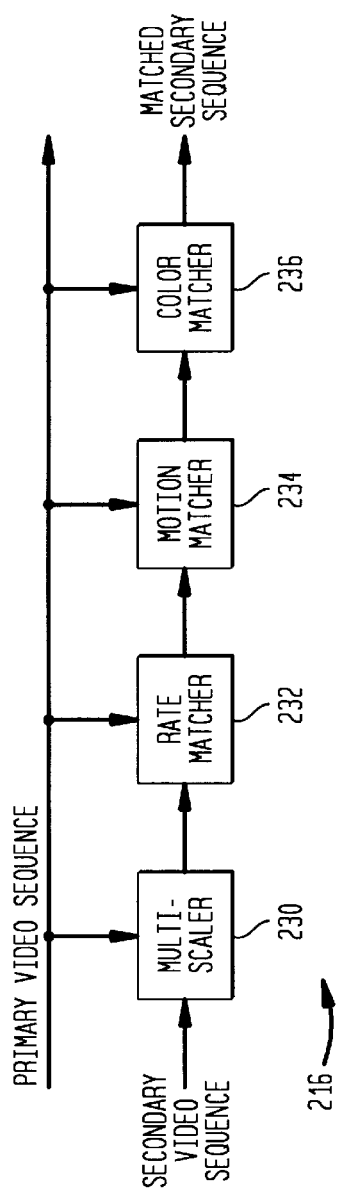
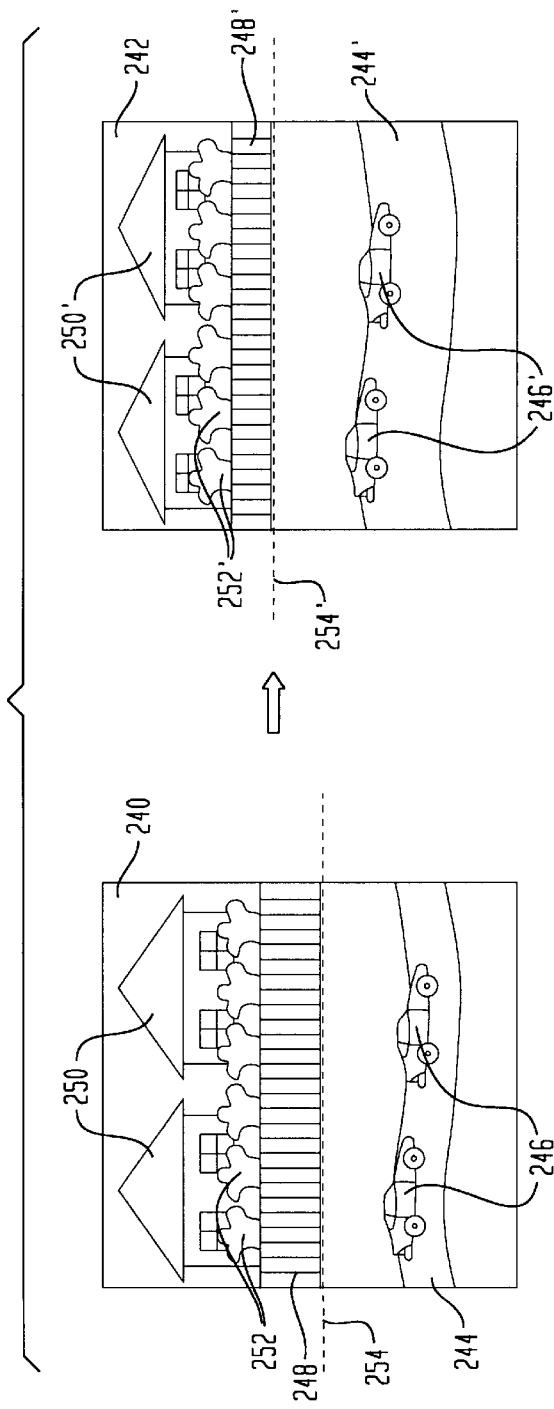

VISUAL DISPLAY SYSTEMS AND A SYSTEM FOR PRODUCING RECORDINGS FOR VISUALIZATION THEREON AND METHODS THEREFOR

RELATED APPLICATION

This application is a continuation-in-part application of copending and commonly assigned U.S. patent application, Ser. No. 08/669,338, entitled "VISUAL DISPLAY SYSTEMS AND A SYSTEM FOR PRODUCING RECORDINGS FOR VISUALIZATION THEREON AND METHODS THEREFOR" of Shmuel Banitt, filed on Jul. 2, 1996, (a) which was a continuation-in-part of U.S. patent application Ser. No. 08/251,417, entitled "VISUAL DISPLAY SYSTEMS AND A SYSTEM FOR PRODUCING RECORDINGS FOR VISUALIZATION THEREON AND METHODS THEREFOR" of Shmuel Banitt, filed on May 31, 1994, now abandoned, and (b) claimed priority on copending PCT Application No. PCT/US/95/06700 entitled "VISUAL DISPLAY SYSTEMS AND A SYSTEM FOR PRODUCING RECORDINGS FOR VISUALIZATION THEREON AND METHODS" of Shmuel Banitt filed on May 31, 1995.

FIELD OF THE INVENTION

The present invention relates to methods for acquisition, preparation, processing and display of visual information in general. The present invention relates in particular to visual display systems and methods for displaying three dimensional moving visual images and stimulating the feeling of viewer participation in the displayed motion picture. The present invention also relates to a system and a method for producing recordings of the images for display on the visual display systems.

BACKGROUND OF THE INVENTION

There are several known methods to perceive depth. Examples are stereoscopic perception of depth, posychological perception of depth using visual cues and the use of changing focus to perceive depth. A viewer viewing a scene in which the focal point changes will perceive that the scene has depth.

Stereoscopic depth perception requires that the viewer views a scene from two different locations at the same time. In real life, this means that he sees the same scene using both his left eye and right eye to see different images. When two dimensional visual images are substituted for real life, it requires the use of two images taken from different right eye and left eye locations respectively.

On the other hand, a viewer can perceive depth by virtue of a number of psychological depth perception cues which are present in both real life and in two dimensional visual images. Common cues include effects where the change of coloring or softening of the shapes gives a feeling of distance to far objects, distribution of light and shade on an object, overlapping of contours as when a near object hides part of a more distant object, georneritical perspective for example in the case of the converging of the parallel rails of a railroad track as they extend in the distance, movement of an object in a visual image either towards or away from the viewer or audience, and movement for stimulating the Pulfrich effect.

This is true of all the various devices in which two dimensional visual images are projected onto screens. Such devices include televisions, motion picture theaters, training simulators, multi-media systems and so on having applications in the areas of entertainment, work, education, exhibitions, training, etc.

A number of devices had been proposed to permit a viewer or an audience to view three dimensional visual images or at least the illusion of three-dimensional visual images when viewing two dimensional visual images. These fall into three groups: those which provide stereoscopic viewing, those which create the psychological illusion of depth and those. Display images on a three-dimensional display system, such as a surrounding screen.

Devices providing stereoscopic viewing generally require the projection of two pictures of the same view, taken simultaneously by more than one camera from slightly different angles, to emulate the binocular vision of normal eyes. Several examples are shown in U.S. Pat. No. 4,420,230 to MeElveen, U.S. Pat. No. 4,714,319 to Zeevi, and U.S. Pat. No. 5,225,881 to Marks. The use of a vibrating mirror or screen is shown in U.S. Pat. No. 4,130,832 to Sher and U.S. Pat. No. 3,814,513 to Nims et al. Other systems require special spectacles to be worn by the viewer or other devices which direct the proper view to the proper eye, All these systems are cumbersome and costly to use. Also, they tend to cause an uneasy feeling in the observer often resulting in headaches that may become severe. Thus these systems have failed to become popular.

The second approach is shown in U.S. Pat. No. 4,651,219 to Rickert, U.S. Pat. No. 3,582,961 to Shindo and U.S. Pat. No. 4,000,367 to Field wherein depth perception is provided by isolating the image to be viewed. In this way, the stereoscopic cues of the space surrounding the image are suppressed so the inherent psychological depth indicators in the picture can be sensed by the observer who perceives a two dimensional visual image as a three dimensional scene. Other devices which produce a similar result are described in U.S. Pat. No. 3,820,873 to Redington et al., U.S. Pat. No. 4,154,514 to Harvey which utilize a curved screen, and U.S. Pat. No. 4,941,041 to Kenyon which utilizes the Pulfrich illusion.

Other devices for providing three dimensional viewing are also described in the following U.S. Patents:

U.S. Pat. No. 2,468,046 to de los Monteros discloses an apparatus for projecting and viewing images with a depth effect through the use of at least one mirror to reflect the image from a projector onto a screen such that a degree of displacement between the images produces the illusion of stereoscopy.

U.S. Pat. No. 3,514,871 to Tucker discloses a wide angle visual display for a training simulator which eliminates distracting discontinuities found in many wide angle displays. It does so by providing three virtual image lenses between the viewing point and the two dimensional displays and by providing substantial duplication of the projected image on the marginal portions of the displays. This creates binocular vision at the comers of the displays which gives the illusion of three dimensionality.

U.S. Pat. No. 5,274,405 to Webster describes a device into which the head is placed wherein images are projected both to the area of visual attention and the area of peripheral vision of each eye, The images are focused on the screens to provide sharp stereoscopic viewing throughout the field of view.

Still another method which has gained some popularity is the so-called Imax system., of the IMAX Corporation, of 45 Charles street, East Toronto, Ontario, Canada. In this system, the images are taken simultaneously by several motion picture cameras rigidly to mounted together. The images thus acquired are then displayed in a properly fitted cinema theater with similarly configured projectors. The resulting three-dimensional motion picture gives the viewer a very realistic feeling that the action is actually taking place around him. Further, this system does not suffer from the drawbacks of stereoscopic viewing systems—the need for special glasses and the uncomfortable feeling.

However, this system does suffer from an important drawback. As anyone knowledgeable about cinema technology can easily appreciate, filming in a wide angle of view simultaneously (typically, the angle of view in these theaters is 150 degrees or more) is next to impossible in most circumstances—with the major exception of nature shots, scenery such as Niagara Falls filmed from the air and the like. Filming an actor engaged in action or even merely talking is next to impossible, and in any case extremely expensive, since all the lighting, recording and other equipment necessary for the shooting will also be filmed. Thus, this system has also failed to become popular, and there is only a relatively small number of cinemas and of films that were produced by this method.

Other methods for producing three-dimensional moving images are based on computer generated images. An example is U.S. Pat. No. 5,184,956 to Langlais et al., where computer generated data is used to produce a three-dimensional display for the purposes of driving training. It is easy to appreciate by any one skilled in this field that it is not difficult to adapt computer generated imaging techniques to many types of display systems such as stereoscopic display, wide angle display, and also three-dimensional display. This is so because the entire information required of each part of the image is known to the computer's program—including all the three-dimensional structure of each object, its surface color, texture, and so on. This seeming advantage is also the major disadvantage of such systems: the preparation of a realistic image requires painful and elaborate design of each and every detail. Thus the display is either non-realistic or else extremely expensive and laborious.

Today, no known method exists which can produce and display moving images that creates a realistic feeling of participation in the person viewing the display.

Thus there is a need for simple and economical methods for producing, preparing and displaying three dimensional moving images and stimulating the feeling of viewer participation in the displayed movie.

SUMMARY OF THE INVENTION

Generally speaking, the present invention provides a method for generating and displaying three-dimensional-like image sequences, The invention further provides visual display systems and a method for displaying three dimensional visual images and stimulating the feeling of viewer participation with the displayed image. The present invention also provides a system and a method for producing the recordings of the visual images for visualization on the visual display systems.

The method for generating a composites three-dimensional-like image sequence according to the invention, by the assembly of two or more separate image sequences, comprises the steps of:

a) providing a main sequence of images;

b) providing at least one secondary sequence of images the contents of which are at least roughly related to the contents of said main sequence;

c) selecting the positioned relationship of each of said at least one secondary sequence of images and of said main sequence of images;

d) processing each of said at least one secondary sequence of images so as to optimize its matching with said main sequence in the selected positioned relationship with it; and e) displaying said main sequence of images and said secondary sequences of images at the some time and in substantially the same positioned relationship as selected in step (c) above.

The term "three-dimensional-like" as used herein (also referred to herein as "three dimensional", for the sake of brevity), is meant to indicate a sequence of images which is displayed in more than one plane, and which thereby evokes the feeling of real action taking place around the audience. This feeling, more fully described herein, gives the viewer the feeling of being "in the movie", and provides a sense of reality unattainable by regular movies which are displayed in one plane only, as hereinafter defined. The three-dimensional-like image sequence of the invention is "composite", inasmuch as, in order to obtain the said effect, more that one image is displayed, as said, an different planes, the resulting whole image being composed of said different displayed images.

The term "plane", used herein in relation to the display mean on which a sequence of images is viewed, is to be understood to include display surfaces in general, even if they are curved to some extent, and the term "plane" should not be interpreted as meaning that concave or convex surfaces are excluded. Similarly, when reference is made to an image which lies substantially on one plane, this should be understood to include also an image which is displayed on a curved display, as explained above. Furthermore, it should be understood that it is possible to use curved displays essentially made of one piece, onto which a main sequence of images is displayed, along with one or more secondary sequences of images, each sequence of images occupying a different portion of the curved display or screen. As will be apparent to a skilled person, such a single, curved display is equivalent to a plurality of single displays, each used to display a single sequence of images, Furthermore, such a single curved display would necessarily be made of sections which substantially lie in different "planes", as defined above, when using curved displays.

The main sequence of images is preferably, but not limitatively, located in the central part of the composite displayed image. This is because the main image sequence is the standard by which the secondary image sequence is processed, and it will further be, in many instances, of higher quality (in terms of resolution, number of frames, etc.) than the secondary image sequences. However, it is permissible to position the display displaying the main image sequence at some other position relative to the center of the picture, if technical or aesthetic requirements demand it.

Once the position of the main image sequence is selected, it is necessary to select the location of the secondary image sequences within the composite picture. There is no theoretical limitation to the location of the secondary image sequences, and some of them can be located, e.g., above or below the display which displays the main image sequence. (These alternative positions are not shown in the appended drawings, for the sake of brevity, since they are self evident from the description provided for the illustrative geometries). Furthermore, a secondary image sequence may border with a second secondary image sequence, and not with the main image sequence, whereby said second secondary image sequence borders, eg., with the main image sequence. However, for most applications, when it is desired to simplify and reduce the cost of both the process of creating the three-dimensional image sequence, and of displaying it, it is preferred to position the secondary sequences beside the main sequence.

As stated, in order to provide a three-dimensional-likes image, it is necessary that different image sequences be displayed on different planes. Typically, the display on which the main sequence is viewed is positioned at an angle with the one or more displays on which the at least one secondary sequence is viewed. The term "positioned at an angle", however, should be interpreted here to indicate that at least a major portion of the secondary image sequences lies on planes (as hereinbefore defined) which inter-sect the plane on which the main image sequence is displayed, no matter what the actual interface between the display means of the secondary image sequences and of the main image sequence are. Thus, for instance, curved displays may be used, if desired, where the transition from the display of the main image sequence to that of the secondary image sequences is smoother than when using two fully planar displays, positioned at an angle with respect to one another.

As stated, the secondary image sequences are processed in order to provide a matching with the main image sequence. Therefore, according to one preferred embodiment of the invention one or more of the secondary sequences of images has been recorded at a time different from the time at which the main sequence of images has been recorded.

According to another preferred embodiment of the invention, one or more of the secondary sequences of images has been recorded at a location different from the location at which the main sequence of images has been recorded.

According to still another preferred embodiment of the invention, one or more of the secondary sequences of images is computer generated. It is also possible to mix images of different origin. Thus, for instance, in one particular embodiment of the invention some of the images in a sequence of images is computer generated, and some are images acquired by movie or VCR equipment.

According to a preferred embodiment of the invention, the main sequence of images and the secondary sequences of images are recorded on different media. Typically, but non limitatively, the media on which the sequences of images are recorded is selected from among film, video and computer files.

As more fully described below, in many cases, and particularly when different recording and/or displaying methods are used for the main image sequence and for the secondary image sequences, the number of images in a first sequence, for a given sequence display time, may not match the number of images in a second sequence to be displayed together with said first sequence, for the same display time. According to a preferred embodiment of the invention, therefore, the method further comprises matching the image sequences to be displayed together so as to reach essentially identical starting and ending times of display for all sequences.

As stated, the secondary image sequences are processed to optimize their matching to the main sequence of images. According to a preferred embodiment of the invention, the processing of a secondary sequence of images comprises matching the field of view of said secondary sequence to that of the main sequence. According to another preferred embodiment of the invention, the processing of a secondary sequence of images to optimize it matching to the main sequence of images comprises matching the apparent motion of said secondary sequence to that of the main sequence. As will be apparent to a person skilled in the art, the term "apparent is motion" embraces two different types of movements: the first, is the movement that the camera appears to make relative to the scene being recorded, as viewed by the observer. For instance, if the camera rotates 0.3° per frame in the main sequence, to concentrate on an object that was previously at the edge of its field of view, the images in the neighboring secondary sequences must likewise rotate, at the same angular rate.

The second type of apparent motion is that of an object within the image sequence. If, for instance, there is a road extending from the main sequence into a secondary sequence, and a car travels on that road, it cannot appear to change speed abruptly when it reaches the edge of the main sequence, but its movement must continue smoothly on the display of the secondary image sequence.

In yet another preferred embodiment of the invention the processing of a secondary sequence of images to optimize its matching to the main sequence of images comprises matching the displayed action of said secondary sequence to that of the main sequence.

As will be apparent to a person skilled in the art, other parameters of the image can be processed to improve the matching of the image sequences. For instance, in a preferred embodiment of the invention the processing of a secondary sequence of images to optimize its matching to the main sequence of images comprises matching the colors and shades of said secondary sequence to that of the main sequence.

One advantage of the invention is that it is not necessary to provide in all cases image sequences of high quality and resolution. According to one preferred embodiment of the invention, for instance, the resolution of the images in a secondary sequence of images is lower than the resolution of images in the main sequence of images.

The invention can be easily carried out by a skilled person, using available processing tools, illustrative and non-limiting examples of such processing will be provided in the description to follow.

The invention, in another aspect, is further directed to a composite, three-dimensional-like image sequence which is generated by the method of the invention.

Also encompassed by the invention are secondary sequences of images, suitable to be used as a component of a composite, three-dimensional sequence of images comprising a main sequence of images and at least one secondary sequence of images, said secondary sequence of images having a content that at least roughly matches the contents of the main image of said composite, three-dimensional-like sequence of images, and said secondary sequence of images further having been optimized for display together with said main sequence of images.

Thus, according to a preferred embodiment of the invention, also comprised are secondary sequences of images, as described above, which have been optimized by matching one or more of their properties, selected from among their field of view, the apparent motion therein, the displayed action therein, and their colors and shades, to that of the main sequence.

In another aspect, the invention is directed to a visual display system for displaying three-dimensional-like image sequences consisting of a main sequence of images and of at least one secondary sequence of images, said visual display system comprising display means for displaying a main sequence of images, and at least one additional display means for displaying at least one secondary sequence of images, said display means for displaying a main sequence of images, and said at least one additional display means for displaying at least one secondary sequence of images being positioned in substantially the same positioned relationship selected for the generation of the composite three-dimensional-like image.

As will be appreciated by the skilled person, the matching of the secondary image sequences is influenced by the geometry (actual relative position) of the display means used for displaying each image sequence. Thus, for instance, if a smooth transition is provided between two adjacent display means or screens, the matching of the edges of two adjacent images must be made more closely than if, for instance, there is a gap between the two adjacent screens. Therefore, the display means of the invention must take into account the planned positioned relationship of the display means for which the composite image sequence has been generated, Similarly, the display means planned for displaying a movie produced according to the method of the invention must be assembled taking into account the process that was employed in producing it.

The display means can be of any suitable type, and are not limited by the invention, Typically, the display means are selected from among movie screens, video displays and computer displays, or combinations thereof.

The visual display systems can be readily adapted for use in virtually every display system, such as home entertainment systems, televisions, training simulators, multi-media systems, movie picture theaters, exhibitions, etc.

According to one embodiment of the invention, the secondary visual image matching unit comprises at least one of a multi-scaler, a rate matcher, a motion matcher, an edge matcher and a color matcher. The multi-scaler scales the selected secondary visual images to match the scale of the primary visual image. The rate matcher matches the timing of a series of selected secondary visual images to the timing of a series of primary visual images. The motion matcher matches the camera motion in the series of selected secondary visual images to the camera motion of a series of primary visual images. The edge matcher blends each edge of the primary image with the edge of one of the secondary images adjacent thereto. The color matcher matches the color quality of the selected secondary images to the color quality of the primary visual image.

The primary visual image can be a real-life image or a computer generated or animated image. By virtue of the primary visual image being the subject of the displayed image, the secondary visual images need not be taken in the same manner, location or time as the primary image. Instead, the secondary visual images are matched to the primary visual image. Hence, in actual fact, each of the secondary visual images can be a real-life image or a computer generated or animated image. The secondary visual images are typically displayed at a lower resolution than the primary visual image without detracting from the effect of three dimensionality. Furthermore, computerized techniques are utilized to generate movement in the secondary visual images to further enhance the three dimensionality of the displayed image.

Depending on the particular realization of the visual display system, each of the screens can be any one of the following group: a moving picture theater screen, a television screen, a computer monitor, a LCD screen and the like.

The system can also include projection apparatus which, depending on the particular realization of the visual display system, can be any one of the following group: a photographic film projector, a CRT tube and a video projector.

Further features of the visual display systems include providing trapezoid shaped peripheral screens and a plurality of speakers for playing back a soundtrack for accompanying the visual images displayed on the system.

A system and method for producing recordings of visual images for visualization on a visual display system displaying three dimensional visual images are also disclosed. The system includes primary and secondary visual image sources, a selection unit and a secondary visual image matching unit. The primary visual image source stores primary visual images viewing first scenes. The secondary visual image sources store secondary visual images, each of which views scenes which differ from the first scenes. The selection unit selects at least two secondary visual images from the secondary visual image source such that the secondary visual images are compatible with a primary visual image. The matching unit generally matches the selected secondary visual images with the primary visual image.

The primary visual image source can be a recording from any one of the following group: a television camera, a photographic film camera, a computer database and a computer subroutine. In a similar fashion, the secondary visual image source can be a recording from any one of the following group: a television camera, a photographic film camera, a computer database and a computer graphic routine. The system can also include output apparatus for outputting a recording of the secondary visual images and soundtrack apparatus for preparing a soundtrack to accompany the visual images.

There is also provided, in accordance with another preferred embodiment of the present invention, a method of generally matching the camera motion of a first camera with a second camera. The method includes the steps of (a) recording the sequence of visual images produced by said first camera on a recording device, (b) at the time of filming with said second camera, displaying said recorded sequence of visual images and (c) filming with said second camera while attempting to match the camera movement displayed in said recorded sequence of visual images.

The first and second camera can be the same camera operated at different times or two cameras viewing different scenes or the same camera viewing different scenes.

BRIEF DESCRIPTION OF THE DRAWINGS

The present invention is herein described, by way of example only, with reference to the drawings, wherein:

FIG. 5 is a block diagram of secondary image processing apparatus forming part of the system of FIG. 3;

FIG. 6 is a pictorial illustration of scaling of secondary visual images, useful in understanding the apparatus of FIG. 5;

DESCRIPTION OF THE PREFERRED EMBODIMENTS

The present invention relates to a method for the acquisition, preparation and display of three-dimensional-like moving visual images. The method and system can be adapted for use in a variety of systems, such as televisions, training simulators, multi-media systems, movie picture theaters, cinema halls, home entertainment systems, exhibitions, for example.

The principles and operation of the systems and methods of the present invention may be better understood with reference to the accompanying drawings and description.

For the sake of clarity, the term "visual image" as used hereinbelow means and includes the image of any visible object or group of objects which can observed by a viewer. The visual image can be a still visual image or a moving visual image and either of a real-life scene or a computer generated or animated scene. Furthermore, the term "recording" as used hereinbelow means the capture of a visual image in any form which can be used for display of the visual image. Hence, recording includes capturing the visual image with a camera on photographic film, such as motion picture film, as well as capturing the visual image, either permanently in a database or momentarily, in the form of electronic, magnetic, electromagnetic, digital or other signal information which can be reproduced as a visible image on a receiving screen for visualization. Typical screens include a conventional motion picture theater screen, the receiving screen of a conventional home television set, a computer monitor, an LCD screen, for example. Also, "recording" can mean any method of non-visual data recording, such as coordinates locations in a set of given time points, that can be later used in construction of the final image, or similar systems. For example, camera and actor movements can be recorded and used later.

For the discussion of the present invention, and in order to make the term completely clear, we shall now define the term "three dimensional visual display", to mean an apparatus that can display images on one or more surfaces that together span a substantial part of a cylindrical or polyhedral or other convex shape encompassing a volume, so that motion of a displayed point or image upon that screen can have substantial velocity in all of the three axes—x, y, and z. This can be achieved by generating display means in very many different configurations. For instance, a display can be a complete cylindrical screen, or a part of such a screen encompassing at least 50 degrees, or a set of three screens with angles of at least 20 degrees between them etc. However, it should be understood that the actual nature of the display means is not important, as long as such display means permit the simultaneous display of the main and secondary image sequences produced according to the invention, for each particular desired case.

Figure 1:
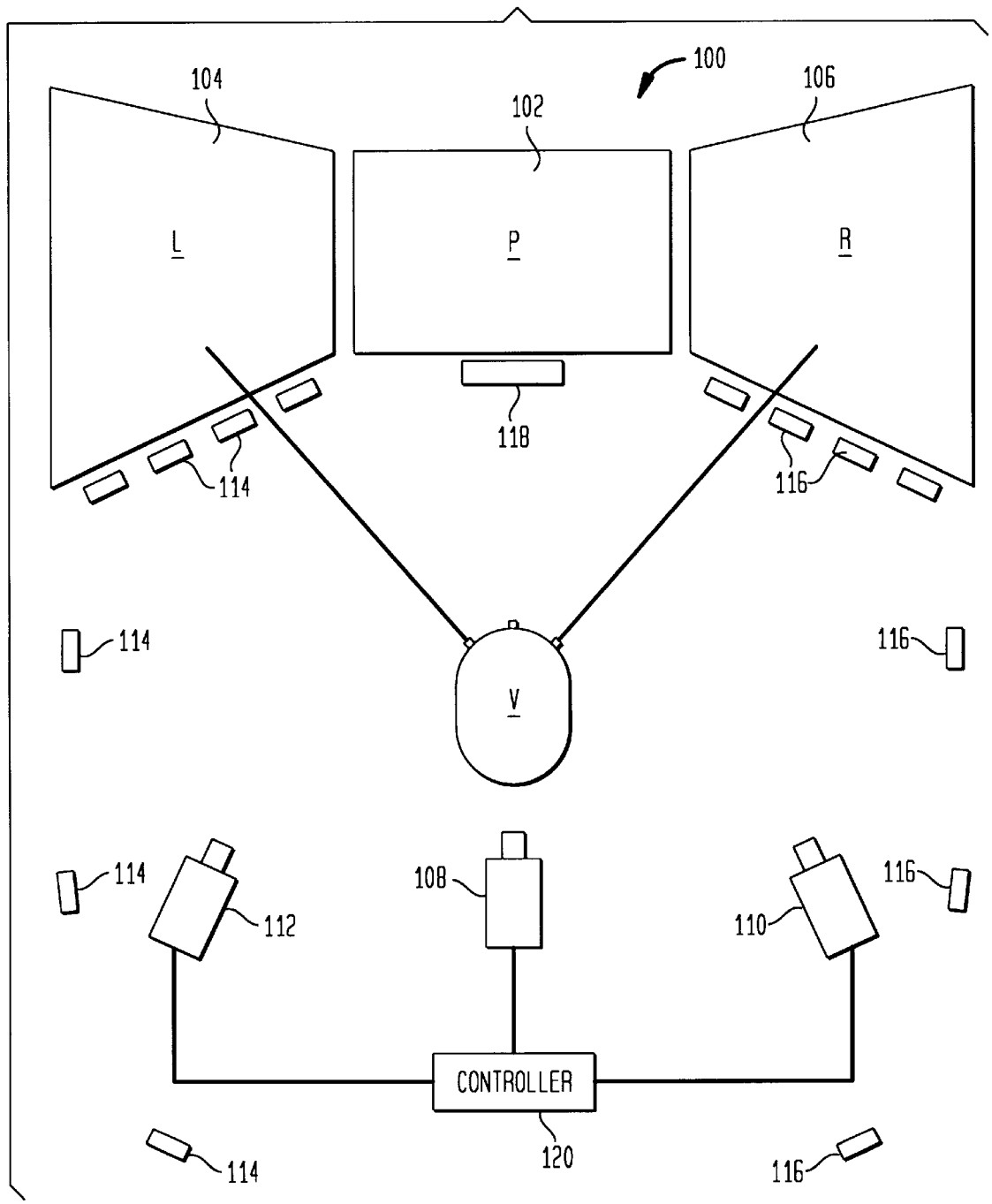
FIG. 1 is a schematic illustration of a visual screen system for displaying three dimensional visual images constructed and operative in accordance with the teachings of the present invention.
Figure 2A:
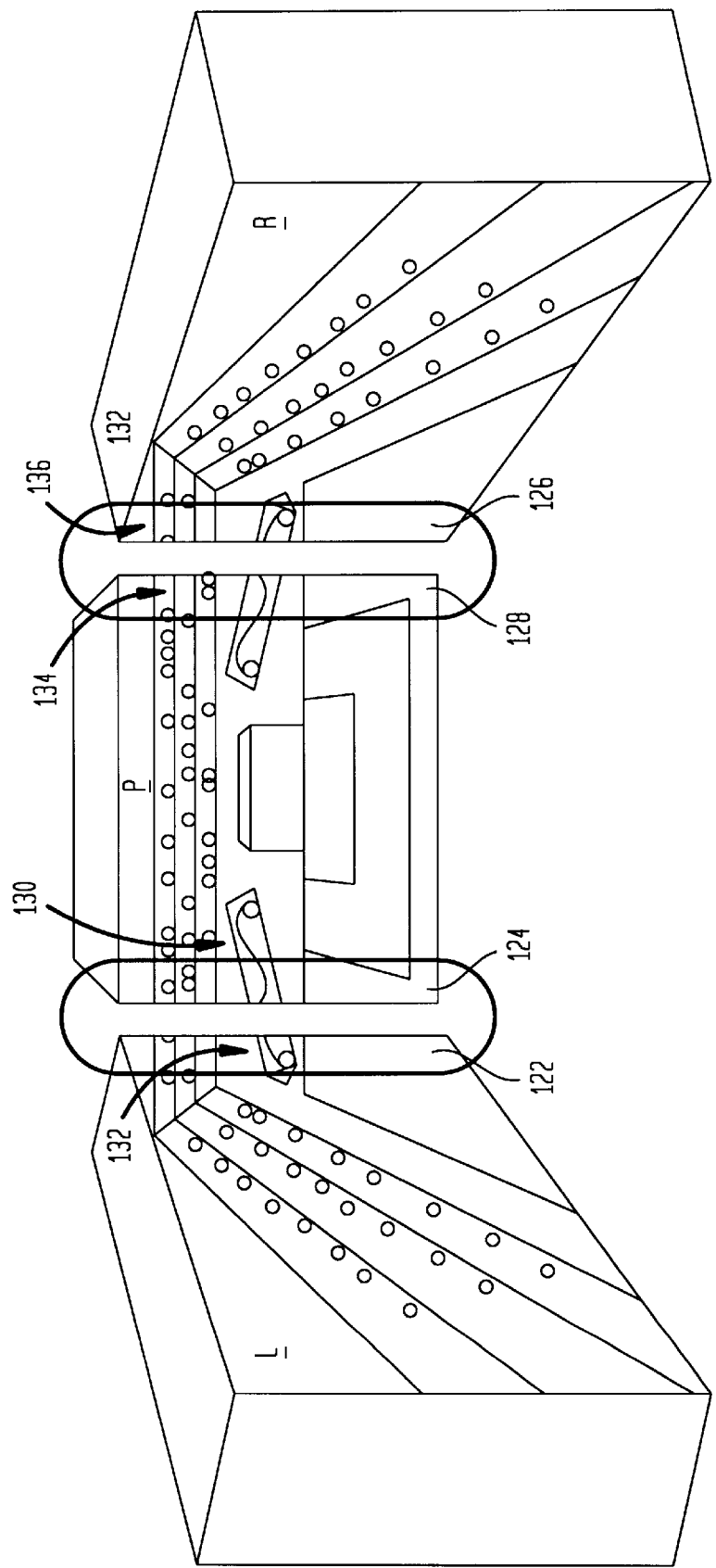
FIGS. 2A–2C show primary and secondary visual images for creating the three dimensional visual images as displayed by the visual display system of FIG. 1.
Figure 2B:
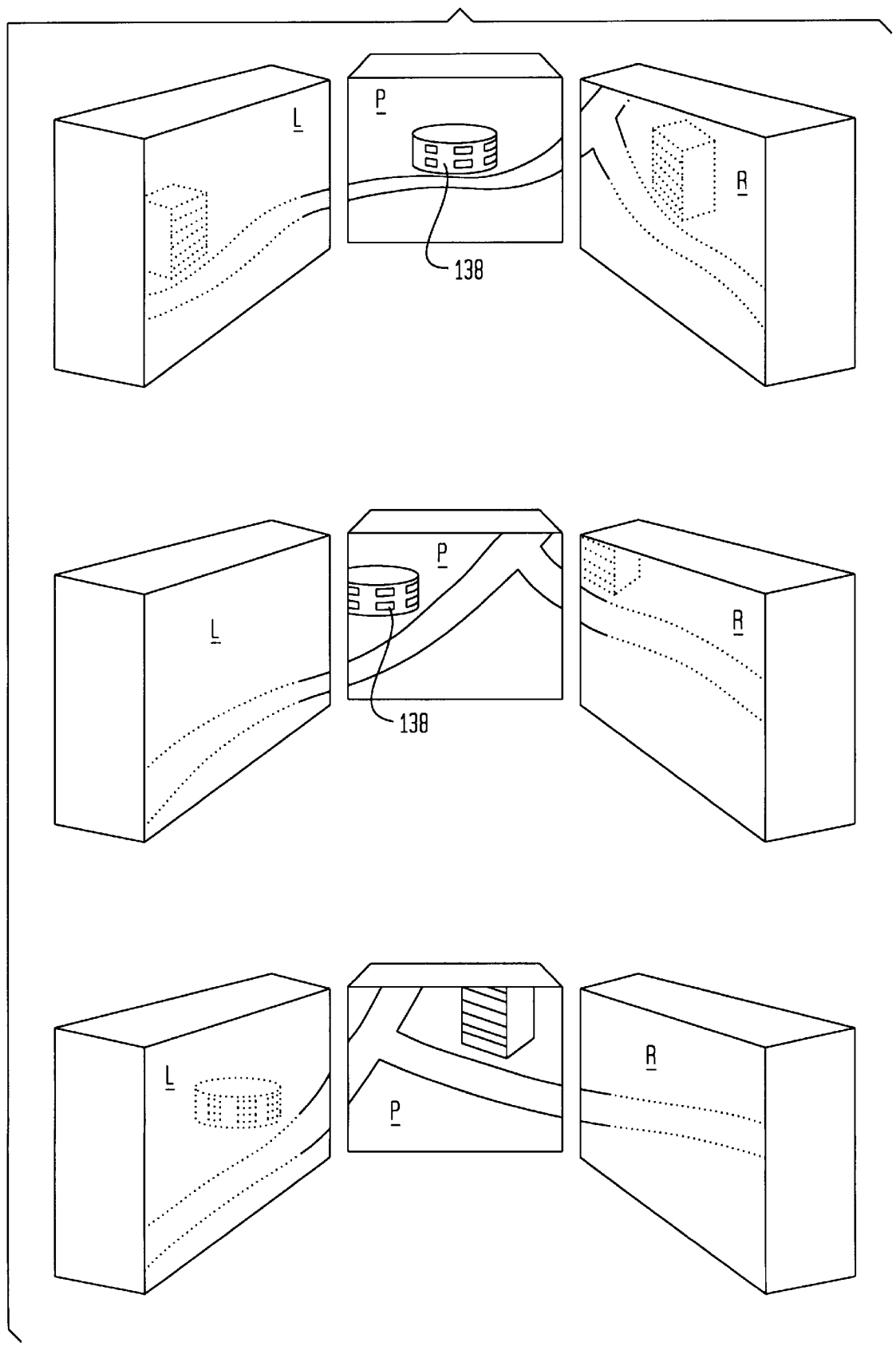
Figure 2C:
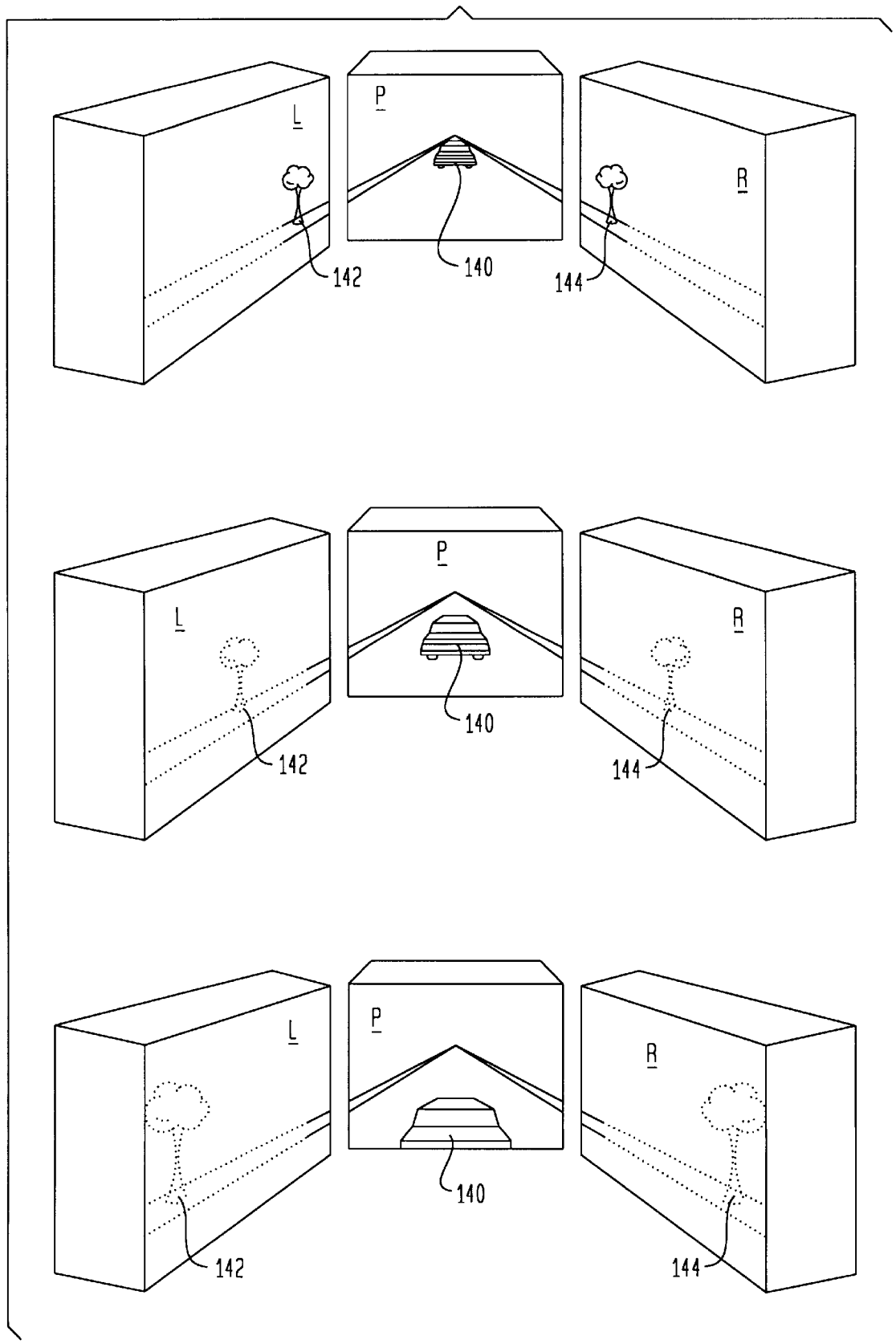
Figure 3:
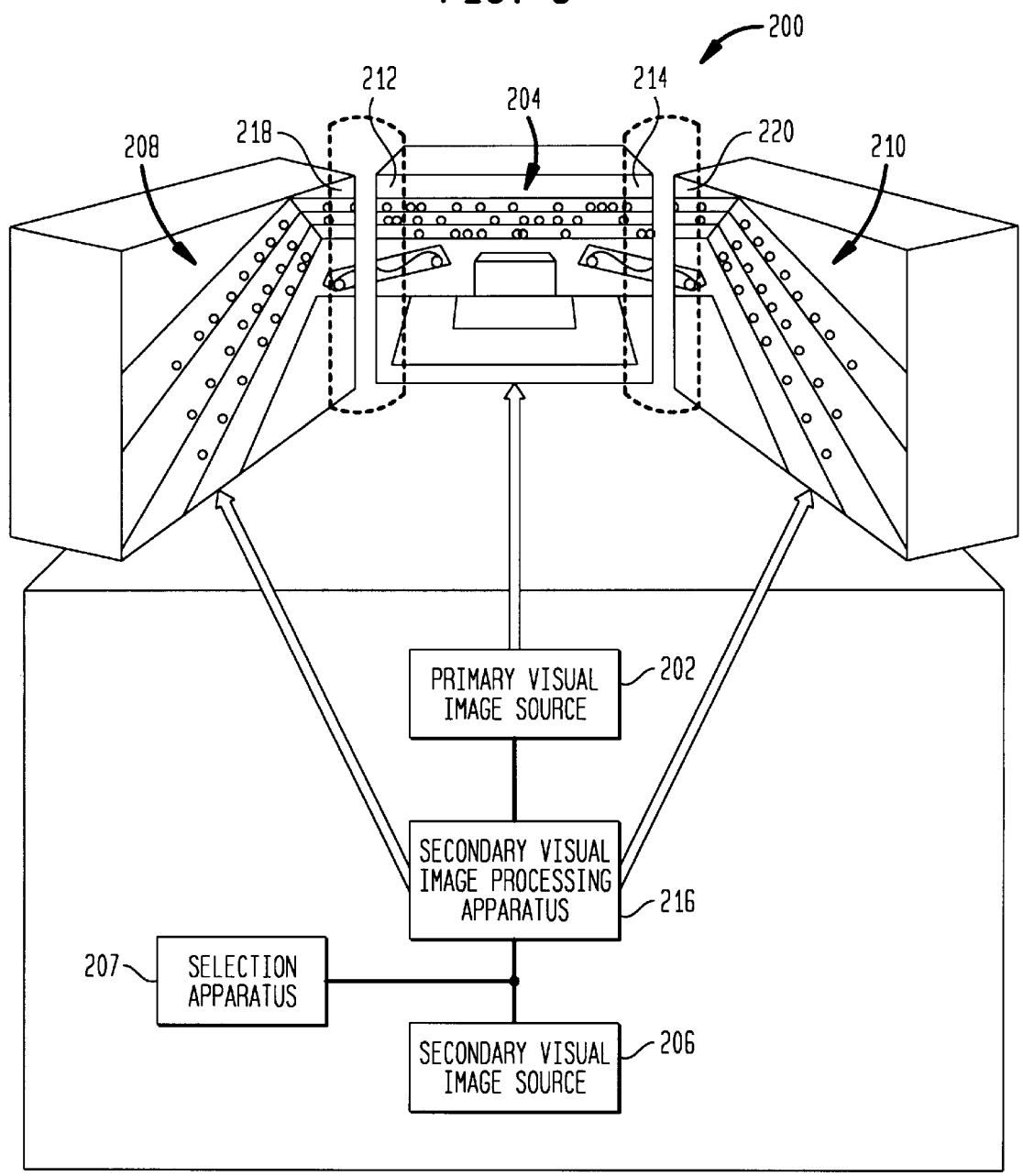
FIG. 3 is a schematic illustration of a system for producing recordings of visual images for visualization on the visual display system of FIG. 1.

Without loss of generality we will in our preferred embodiment describe a display system built of three flat surfaces, as shown in FIGS. 1, 2 and 3. While the example herein is illustrated with two peripheral screens, it will be appreciated that any number of peripheral screens may be provided, including above or below main screen 102. Furthermore, it should be noted that there can be a physical gap between main screen 102 and peripheral screens 104 and 106 without detracting from the effect of three dimensionality. Also, peripheral screens 104 and 106 can be trapezoid shaped to further enhance the feeling of three dimensionality depth.

Referring now to FIG. 1, there is shown a schematic illustration of a visual display system, generally designated 100, constructed and operative according to the teachings of the present invention. Visual display system 100 is in the form of a wide angle, multi-screen system including a main screen 102 for displaying a primary visual image, generally designated P, and two peripheral screens 104 and 106 for displaying secondary left and right visual images, generally designated L and R, respectively. System 100 further includes a projection device 108 for projecting a recording of visual image P on main screen 102 and projection devices 110 and 112 for projecting recordings of secondary visual images L and R on peripheral screens 104 and 106, respectively.

Peripheral screens 104 and 106 are inclined towards a viewer or audience V such that visual images L and R together with the two dimensional primary visual image P displayed on main screen 102 form a three dimensional visual image.

As will be described in greater detail below, psychological cues can be provided to secondary visual images L and R for enhancing the feeling of observer or audience participation with the visual image being displayed on system 100. The observer's feeling of three dimensionality can be still further enhanced through the playback of a soundtrack through a number of speakers 114 and 116 extending along peripheral screens 104 and 106, respectively, and behind a viewer or audience V, to wrap around viewer or audience V. Speakers 114 and 116 are typically in addition to a speaker 118 associated with main screen 102, as known in the art. Typically, a controller 120 controls the operation of projectors 108, 110 and 112 such that secondary visual images L and R are displayed in synchronization with primary visual image P.

The method disclosed here provides for acquisition, preparation and display of three dimensional images. As the terms for recording or acquiring the images have been described, and so have the terms for the three-dimensional display, we shall now briefly define what is meant by preparation, or processing of the recorded image sequences. One of the key novelties of the present invention is that it allows images to be displayed that were not recorded in the precise coordination or synchronization that is required of images that need to be displayed according to the disclosed art. The images should be displayed so that the feeling of a unified field of view should be evoked in the observer, as would have been the case had several cameras simultaneously and synchronously recorded the images. This requires the images to be processed so that the result would be suitable for display and will evoke the desired effect. This preparation and processing is disclosed as being operated on a digital computer using techniques of image and other data processing some of which are novel and will be disclosed here and others which are known to those familiar with the art and science of image processing. Thus, the recording of the different image sequences are rid of the requirement for precise coordination and synchronization, so much so that for the different views, according to the invention, images can be used that were recorded in different places and or times, sometimes extremely so, and later prepared so that they can be displayed together on the three dimensional display and evoke in the observer the feeling that the action is taking place around him.

Optical flow and other image processing techniques useful in the present invention are described in the book *Digital Image warping* by George Wolberg, IEEE Computer Society, pg. 1990; in the book *Three Dimensional Computer Vision*, by O. D. Faugeras, MIT Press and in the following articles:

M. Irani, B. Rousso and S. Poleg, "Detecting and Tracking Multiple Moving objects using Temporal Integration", *European Conference on Computer Vision*, pp. 282–287 Santa Margarita Ligure, May 1992;

M. Irani, B. Rousso and S. Poleg, "Computing Occluding and Transparent Motions", *International Journal of Computer Vision*, February 1993; and S. Ullman and R. Basri, "Recognition by linear combinations of models", *IEEE Transactions on Pattern Analysis and Machine Intelligence*.

The books and articles are incorporated herein by reference.

With reference now to FIGS. 2A–2C, there is shown a number of visual images L, P and R for creating the three dimensional visual images displayed by visual display system 100. In principle, the effect of three dimensionality is achieved by the primary visual image being picked up by the direct vision of the eye and the secondary left and right visual images being picked up substantially by the peripheral vision of the left and right eyes respectively. This means that rather than having to display three continuous visual images of a panoramic view of a scene, in actual fact, secondary visual images L and R can display substantially different subject matter than visual image P as long as there is a logical correlation or matching therebetween.

However, in practice, the field of view of the direct vision of a viewer or an audience includes all of primary visual image P and the edge portions of secondary visual images L and R adjacent thereto. Therefore, the edge portions or margins of visual images L and R are preferably tailored to blend with the edge portions or margins of primary visual image P adjacent thereto, thereby ensuring that a viewer or an audience perceives a mental image of a single scene, even though it is formed from left visual image L, primary visual image P and right visual image R.

With reference now to FIG. 2A to summarize the above, the edge portion or margin of visual image L denoted 122 blends with the edge portion or margin of primary visual image P adjacent thereto denoted 124 to ensure that a viewer or an audience perceives a single scene. In a similar manner, the edge portion or margin of visual image R denoted 126 blends with the edge portion or margin of primary visual image P adjacent thereto denoted 128 to ensure that a viewer or an audience perceives a single image.

In particular, tailoring of pair of edge portions 122 and 124 includes feature blending such that a feature which appears in edge portion 124 is continued such that it appears in edge portion 122 and color blending such that a colored region which appears in edge portion 124 is continued such that R appears in edge portion 122. For example, a signpost 130 on edge portion 124 of primary visual image P is continued as a signpost 132 on edge portion 122 of visual image L. In a similar manner with reference to edge portions 126 and 128, a crowd of spectators shown as a patterned area 134 on edge portion 128 of primary visual image P is continued as a patterned area 136 on edge portion 126 of visual image R.

In contrast to edge portions 122 and 126 which have to include subject matter continuous with the subject matter of edge portions 124 and 128, respectively, visual images L and R only have to include subject matter which tends to match the subject matter of primary visual image P. It should be understood that "tends to match" entails that the subject matter of visual images L and R shares a logical correlation to the subject matter of visual image P in terms of the nature of features, size of objects, etc. However, while the logical correlation is of course important, the visual correlation is of primary importance. Thus, for instance, if the main image shows a meadow dotted with cows, a secondary sequence may include green hills taken at an altogether different location and time, but cannot include views of the craters of the moon or dunes from the Gobi desert.

However, if the cow dotted meadow appears to be filmed by a camera that travels along a road that curves to the left, the side image of the green hills should shift and rotate in a completely matching way to create the illusion of unified field of view and of apparent motion.

This feature of the invention enables the use of visual images taken from a library of visual images of real-life shots taken at the same location at a different time or even from a different location. For example, if primary visual image P is a live transmission of a Cup Final soccer game, then visual images L and R can be images of a crowd of spectators taken, for example, from another game played a year before. In another case, images for three screens can be recorded non simultaneously, where processing of the raw images by a computer renders them fit for three-dimensional display, eliminating various discrepancies caused by the recording method, as will be explained hereinafter.

Furthermore, it enables the use of computer generated or animated visual images L and R to be used with real-life primary visual images P without detracting from the three dimensionality effects of depth and the feeling of viewer and audience participation. In this case, the library of visual images can include pre-prepared computer generated or animated scenes or computer graphic routines for preparing objects such that custom-made montages L and R can be prepared to match primary visual image P.

With reference now to FIG. 2B, three consecutive frames for display as visual images L, P and R are shown to illustrate the use of psychological depth perception cues embodied within secondary visual images L and R for enhancing the effect of three dimensionality. As described in the Background of the invention, common psychological depth cues are as follows. First change of coloring or softening of the shapes gives a feeling of distance to far objects. Second, distribution of light and shade on an object, Third, overlapping of contours as when a near object hides part of a more distant object. Fourth, geometrical perspective, for example, in the case of the converging of parallel rails of a railroad track as they extend in the distance. And finally, adding movement towards and away from the viewer or audience for creating the Pulfrich effect. As shown in FIG. 2B, looking at the frames from top to bottom, the viewer perceives a clockwise rotating shot through the movement of the buildings and in particular building 138 from visual image P to visual image L.

With reference now to FIG. 2C, three consecutive frames for display as visual images L, P and R are shown to illustrate the use of movement for intensifying three dimensionality and the feeling of viewer or audience participation in the visual image displayed on system 100. Looking at the frames from top to bottom, the viewer perceives a zoom shot towards automobile 140 as further emphasized through the enlargement of trees 142 and 144 as they approach the viewer or audience. Also, the notion of movement is enhanced by a suitable soundtrack played through speakers 114 and 116 of system 100 as known in the art. It should be noted that in the case of a still picture primary visual image P. secondary visual images L and R can include the above mentioned psychological depth perception cues including movement as long as the condition of continuity remains between the features present in pair of edge portions 122 and 124 and edge portions 126 and 128.

A further advantage of visual display system 100 is that it is not necessary to provide secondary visual images L and R of equal resolution with that of primary visual image P as demonstrated by the use of dotted lines in visual images L and R rather than the use of solid lines in visual image P in FIGS. 2A–2C. This enables the use of lower resolution, and therefore typically less expensive and troublesome, technology for capturing visual images L and R than for capturing primary visual image P. For photographic film camera is used to capture primary visual image P. Attentively, this enables the use of lower resolution, and therefore typically less expensive, technology for displaying visual images L and R than for displaying primary visual image P. For example, LCD screens can be used to display visual images L and R while a television screen is used to display primary visual image P.

Figure 4:
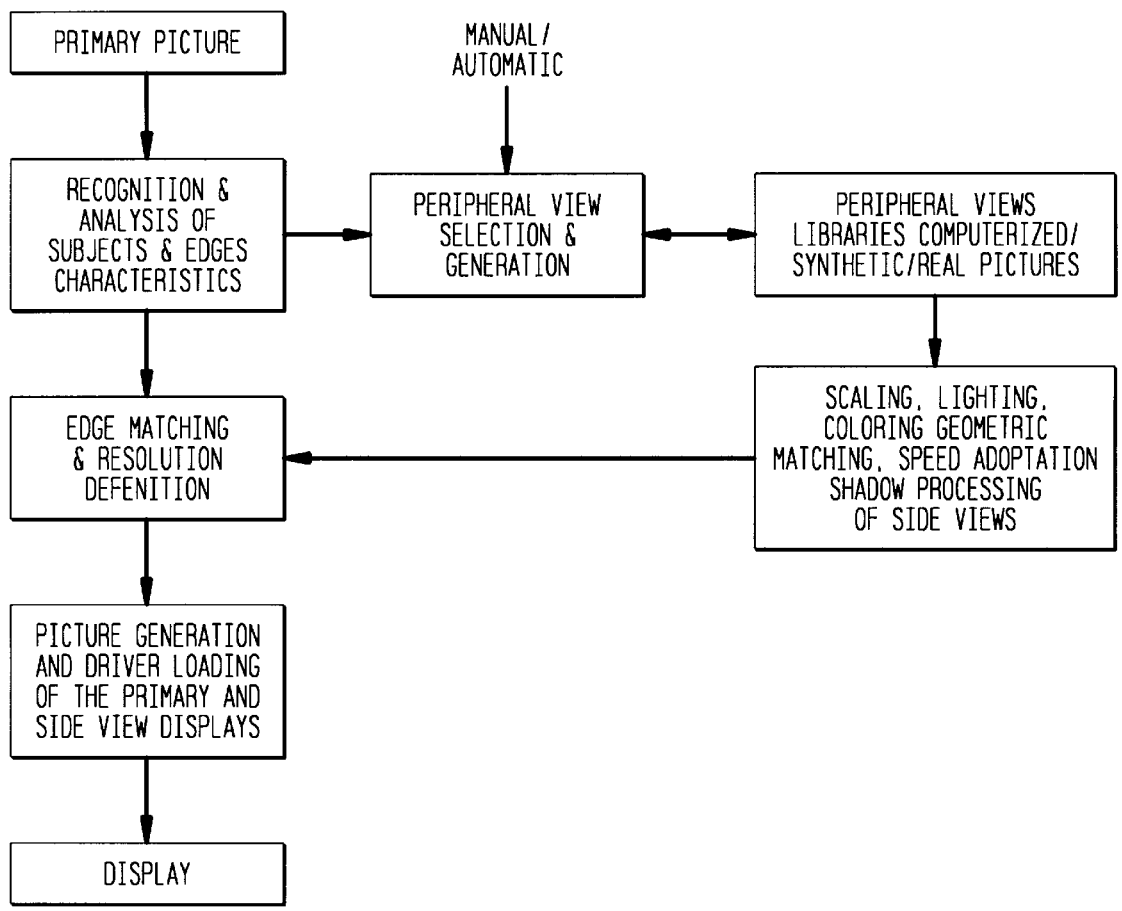
FIG. 4 is a flow chart illustrating the operation of the system of FIG. 3.

With reference now to FIGS. 3 and 4, there is shown a system, generally designated 200, and a flow chart for recording and preparation of visual images L, P and R, and preferably an accompanying soundtrack, for enabling three dimensionality when displayed on visual display system 100 (see FIG. 1). As will become apparent below, system 200 can be realized in hardware and software well within the purview of those skilled in the art. Furthermore, system 200 can be designed either to require considerable degrees of operator intervention by a film or TV editor along with a soundtrack editor or be fully computerized when integrated into a training simulator or multi-media system.

For the purposes of highlighting particular aspects of the present invention, the preparation of recordings of visual images L and R for visualization alongside a primary visual image P in the form of a movie picture in a movie picture theater is now described, it will be appreciated that the description below pertains to one example of application, and many aspects could be changed, such as the number and geometry of the screens, the nature of the display media, the frame rate etc.

Figure 10:
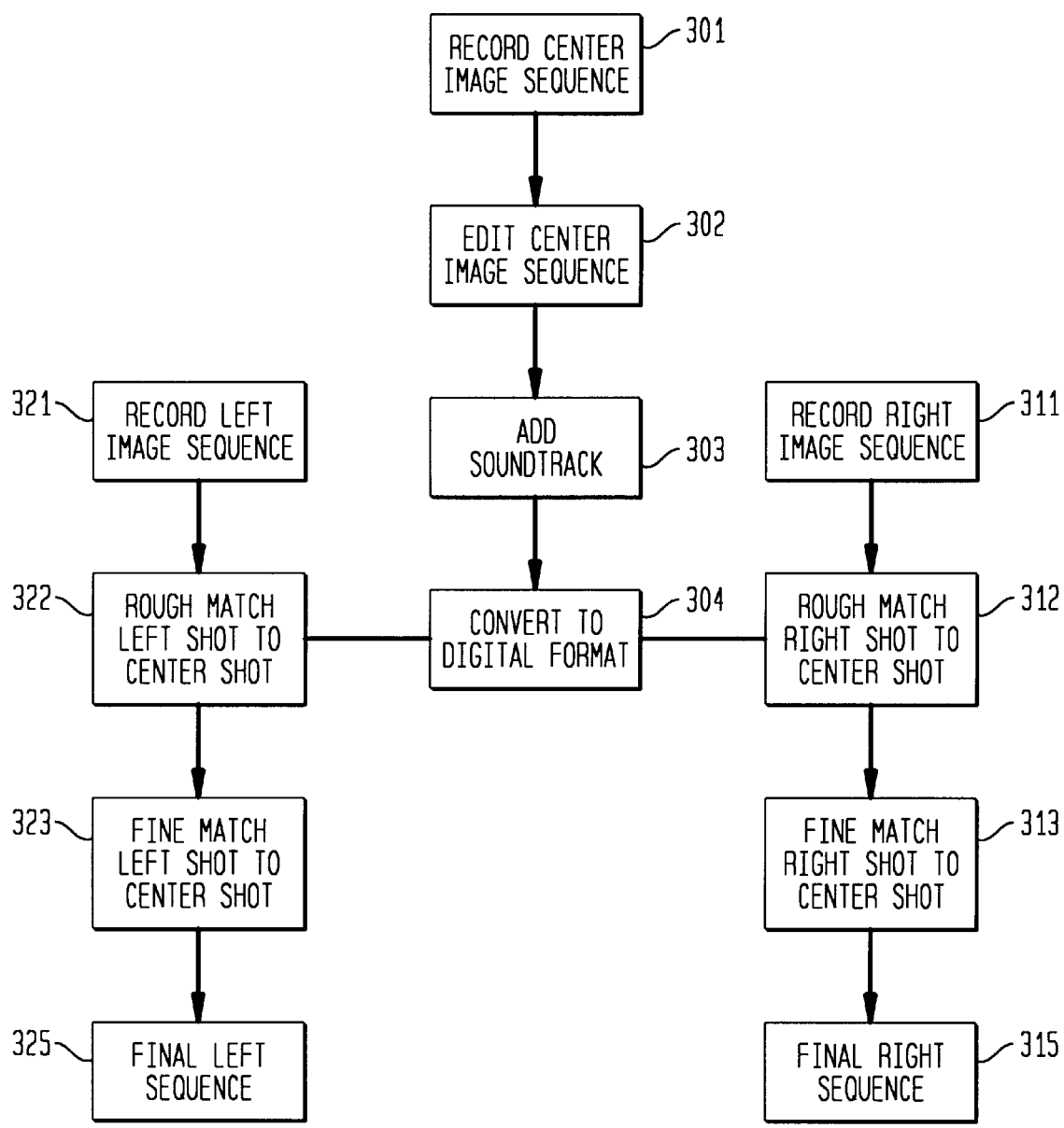
FIG. 10 is a flowchart which illustrates the image acquisition and processing, according to a particular embodiment of the invention.

First, subject matter of the center image sequence recorded (301) and edited (302) in the customary way, as shown in FIG. 10 and as described more fully below, to produce a sequence of "shots", each being again a sequence of image frames of duration usually 10 to 20 seconds, that is, between about 250 to about 500 frames long, to produce a finished version of the recording of primary visual image P for visualization on main screen 102. The recording of primary visual image P is then imported using a Telecine, another film-to-video conversion unit or directly into a computerized video editing machine in which primary visual image P is digitized, thereby providing a primary visual image source 202. Primary visual image P can be viewed on a display 204, thereby enabling the processing of secondary visual images L and R as now described.

The processing will be first described below in general terms. A more detailed description follows, with reference to FIGS. 10 and 11.

Unprocessed left and right secondary visual images are selected using selection apparatus 207 and retrieved from a secondary visual image source 206 having subject matter compatible with primary visual image P and displayed on left and right side screens 208 and 210, respectively. Source 206 can include other shots taken, for example, using television cameras, from the same location but at another time as the taking of primary visual image P or a different location. Alternatively, source 206 can include a library of visual images in the form of pre-prepared computer generated or animated scenes or computer graphic routines for preparing objects such that a custom-made montage can be prepared to match primary visual image P.

In the case of a more automated system 200, image processing software, for example, PHOTOSHOP, available from Adobe Systems Inc. of Mountainview, Calif., USA, can be employed for analyzing the subject matter of primary visual image P. In particular, analysis in terms of features, colors, lighting and so on is made of edge portions 212 and 214 which are to be displayed alongside secondary visual images L and R, respectively.

The unprocessed secondary visual images L and R are processed by secondary visual image processing apparatus 216 for matching secondary visual images L and R with primary visual image P. The image processing includes generally matching the overall shading, lighting, coloring, geometry and shadows as well as object and camera movement such that visual images L and R include psychological depth perception cues for when the recordings of visual images L and R are visualized on visual display system 100. Furthermore, both object and camera movement is incorporated within secondary visual images L and R such that the effect of three dimensionality is enhanced in the visualization of the recordings on visual display system 100.

In one embodiment, secondary visual image processing apparatus 216 tailors edge portions 218 and 220 of secondary visual images L and R to edge portions 212 and 214 of primary visual image P such that pair of edge portions 212 and 218 and pair of edge portions 214 and 220 blend so as to form visual transitions between primary visual image P and secondary visual images L and R, respectively. This is achieved by ensuring that features and colors which appear in edge portion 212 are continued such that they appear in edge portion 218. In a similar fashion, features and colors which appear in edge portion 214 are continued such that they appear in edge portion 220. Visual images L and R can be output as video recordings, computer databases, etc.

And finally, a soundtrack (step 303, FIG. 10) is prepared to accompany the visual display such that its playback through speakers 114 and 116 of system 100 can be employed to enhance the effect of three dimensionality in general and the feeling of space and viewer and audience participation in particular.

Reference is now made to FIG. 5 which illustrates the elements of the secondary visual image processing apparatus 216 useful in a second embodiment of the present invention for generally matching the object and camera movement in the primary and secondary visual images. Reference is also made to FIGS. 6, 7A, 7B and 8 which detail the operation thereof. It will be appreciated that the secondary visual image processing apparatus 216 typically operates on each series of secondary visual images L or R separately.

Apparatus 216 typically operates in conjunction with an operator and comprises a multi-scaler 230, a rate matcher 232, a motion matcher 234 and a color matcher 236. The multi-scaler 230 scales the secondary visual images L and R so that objects therein and in the corresponding primary visual image P will have approximately the same size. Rate matcher 232 adjusts the timing of the series of secondary visual images L and R (after scaling) to approximately match that of the series of primary visual images P. The motion matcher 234 adjusts the camera motion of the series of secondary visual images L and R (after scaling and flow matching) to approximately match that of the series of primary visual images P. Finally, the color matcher 236 approximately matches the color (luminance and saturation) of the secondary visual images L and R with that of the primary visual image P. The output of the color matcher 236 is a series of secondary visual images L' and R' which match, in some way, the series of primary visual images P.

FIG. 6 illustrates the operation of the multi-scaler 230. Image 240 is the original image and image 242 is the scaled image. Image 240 is divided into a plurality of sections as a function of the objects within the image. For example, image 240 is shown having a road 244, two cars 246, a fence 248, two houses 250 and some bushes 252. If the primary visual image P has the fence 248 at a different vertical location, secondary image 240 has to be changed.

Multi-scaler 230 changes the size of all the sections of the image, as desired. For example, a line 254 is shown moved vertically upward from image 240 to image 242. It is labeled 254' in image 242. In order to move line 254, the sections of the image below and above it are resealed to match the desired amount of movement. Thus, the lower section of image 240 is scaled up, in accordance with known methods, and the upper section of image 240 is scaled down, also in accordance with known methods. As can be seen, the objects 244', and 246' are larger in image 242 and the objects 248', 250' and 262' are smaller.

Rate matcher 232 attempts to match the rate of flow of objects, or the timing of their movement, in the series of secondary visual images L and R with that in the series of primary visual images P. For example, if a bird flies across the scene in the primary visual image P and into the scene in the secondary visual image L, its rate of flight should be the same in both sequences. If the camera pans the scene in the primary visual image P into the secondary visual image R, it ought to pan at the some rate.

Figure 7A:
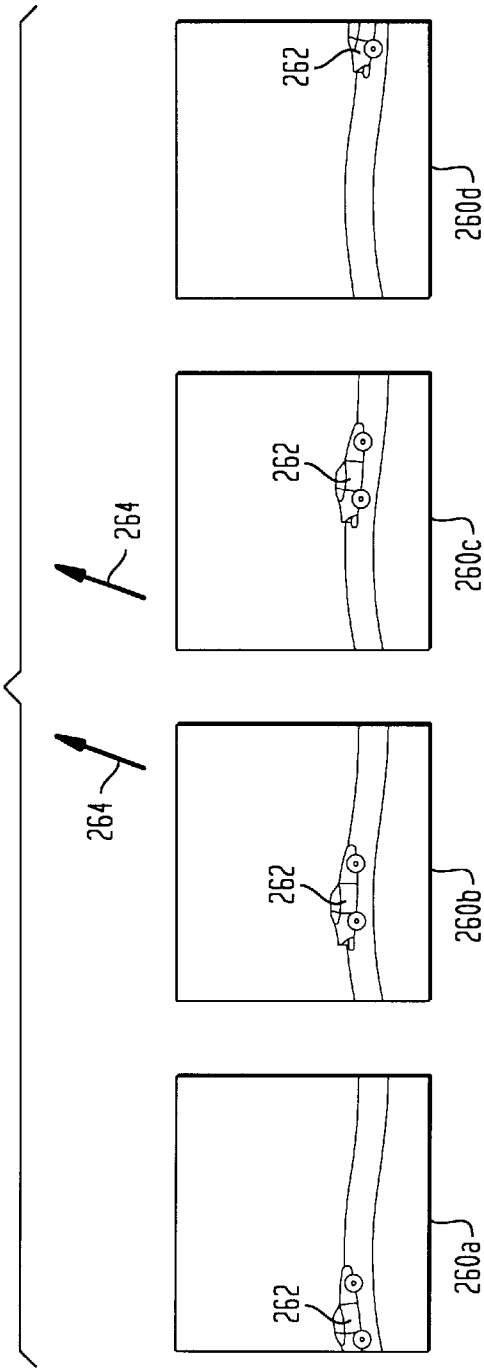
FIGS. 7A and 7B are pictorial illustrations of two series of secondary visual images, useful in understanding the apparatus of FIG. 5.
Figure 7B:
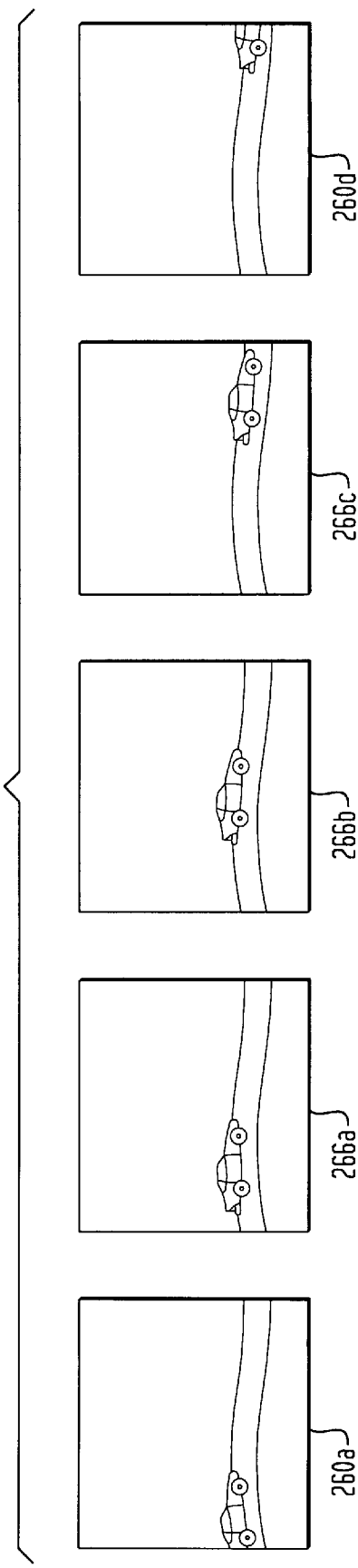
Figure 8:
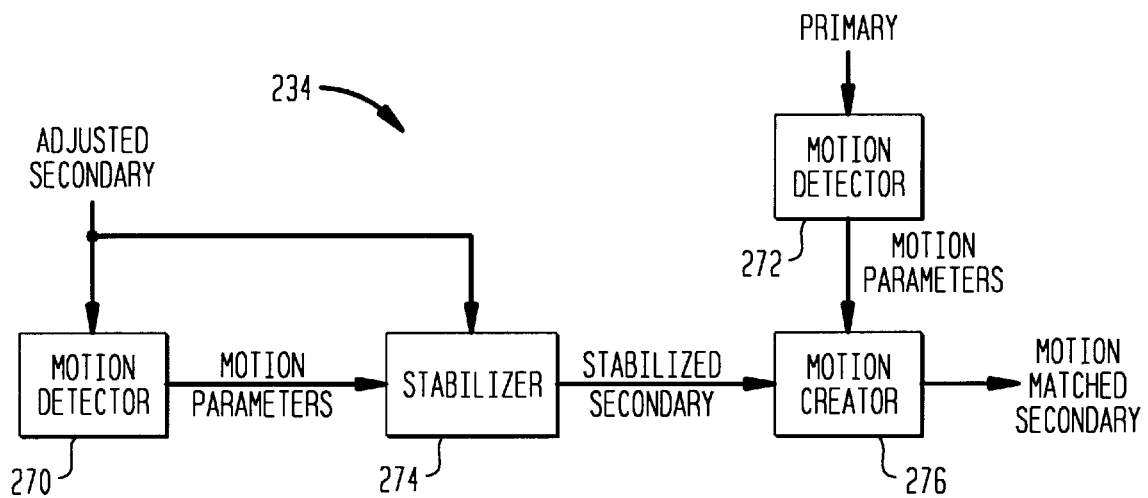
FIG. 8 is a block diagram illustration of apparatus for matching motion, useful in understanding the apparatus of FIG. 5.

Rate matcher 232 first determines the rate of movement of an object in all three series of images and then synthesizes part of the series of secondary visual images L and R to force the rates to match. For example, and as shown in FIG. 7A, it may take four secondary images 260a–260d for a car 262 to move from the left to the right of the image. However, in the series of primary visual images P, it took five images. Thus, the rates of flow do not match. Accordingly, rate matcher 232 removes the middle images, as indicated by arrows 264, and synthesizes a series of replacement, intermediate, secondary images 266a–266c, in accordance with known "optical flow" techniques to force the flow rate of the series of secondary visual images to match that of the primary visual images P.

Figure 9:
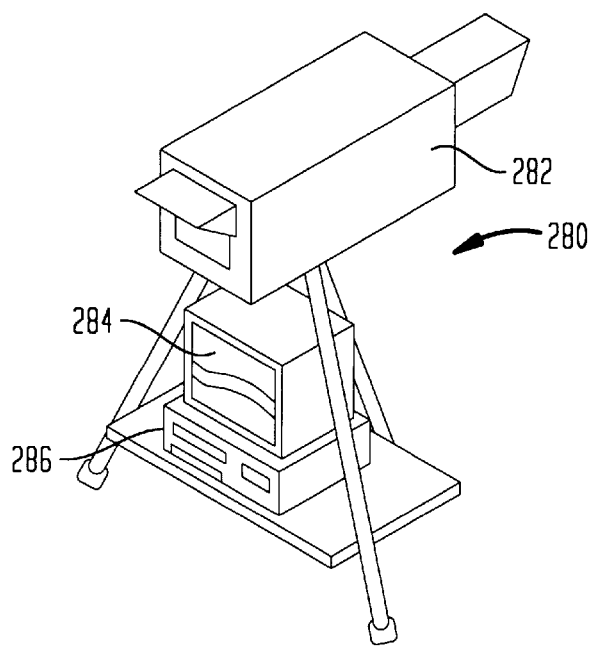
FIG. 9 is a schematic illustration of camera motion recording apparatus, useful in the present invention.

Motion matcher 234 forces the camera motion of the series of secondary visual images L and R to approximately match that of the series of primary visual images P. FIG. 9 illustrates the elements of the motion matcher 234 and indicates that motion matcher 234 comprises two motion detectors 270 and 272, a stabilizer 274 and a motion creator 276. Motion detector 270 determines the camera motion of the series of secondary visual images and provides motion parameters to the stabilizer 274 which, in turn, removes the camera motion from the series of secondary visual images. Motion detector 272 determines the camera motion of the series of primary images and provides the motion parameters to the motion creator 276. Motion creator 276 implements the motion of the primary images P onto the stabilized series of secondary images L and R.

Motion detectors 270 and 272 can be any suitable elements which detect the motion of the camera vis-a-vis the scene (rather than the motion of the objects within the scene). Stabilizer 274 can be any unit which implements the inverse motion from a set of motion parameters. Motion creator 276 can be any unit which transforms a series of stabilized images into one having a motion defined by a set of motion parameters. Motion detectors, stabilizers and motion creators are described in the above-mentioned references.

Color matcher 236 provides the operator with tools to change the colors of the motion stabilized, rate and scale matched secondary visual images L and R to approximately match those of the primary visual image P. An exemplary color matcher is PHOTOSHOP, available from Adobe Systems Inc.

Color is typically defined by it hue, saturation and luminance levels. Often, the overall luminance (or brightness) of an image may be different than another and thus, changing the luminance value of the entire image, or a portion thereof, will help match the images. Alternatively or in addition, it may be necessary to match the saturation (or grayness) of the images. Furthermore, at the edges where objects flow from the primary visual image P to the secondary visual images L or R, it may be necessary to match the hue also, at least for certain objects.

It will be appreciated that further processing, such as to match perspective or to add animation, can also be performed on the secondary visual images L and R.

The present invention also incorporates a method for filming a scene in order to achieve both the primary visual image sequence and the secondary visual image sequences. Typically, the primary visual image sequence is filmed with lots of action, wherein the camera stares directly at the performing actors. Once the action with the actors has ended, the cameraman can then film the secondary visual image sequence. To do so, he rotates the line of sight of the camera to the right and left of the field of view and then films the secondary scenes accordingly. Often, it is desirable to have the camera motion of the secondary visual image sequences approximately match that of the primary visual image sequence, thereby to reduce the amount of processing which the motion matcher 234 has to do.

Reference is now briefly made to FIG. 9 which illustrates an apparatus 280 for enabling a cameraman to approximately match the camera motion of the primary camera when filming the secondary visual image sequences.

The apparatus 280 typically comprises the camera 282, a monitor 284 and a video recorder 286. The cameraman utilizes the camera 282 initially to film the primary image sequence which is displayed, during filming, on the monitor 284. At the same time, in accordance with the present invention, the filmed scene is recorded, typically at a low resolution, on video recorder 286.

When the cameraman turns to film one of the secondary image sequences, whether that be in a similar location or in a completely different one, with the same camera or a different one, he displays the recorded scene from the video recorder 286 on the monitor 284. Paying attention to the camera motion therein recorded, the cameraman attempts the match the camera motion while filming the scenes for the secondary image sequence. He repeats the process for the second secondary image sequence.

The processing of the various sequences is now described in greater detail, with reference to FIG. 10. The left and right image sequences are recorded (steps 321 and 311), on whatever media that has been decided—film, video or other techniques. Now, for each of the two side, or secondary sequences, rough matching (steps 322 and 312) to the center sequence is to be carried out (although, as explained above, the main sequence need not necessarily be positioned at the center). This step will now be explained.

We recall that the center sequence is already edited and ready to be displayed, As is usual in the technology of film production, a rather small percentage of the original material that was recorded is present in the edited product, and it was cut and pasted many times until it received it final appearance. This is true for the center sequence as well as for the side sequences. The raw, as well as the edited sequence, is naturally and customarily subdivided into "shots", or "sequences", each one being a rather short continuous sequence of frames (often 10–20 seconds, or 250–500 frames long). Note that in the film business, a "shot"means a sequence of frames that was obtained by continuous operation of a camera, without cuts. Continuous sequences of frames after editing are called "sequences". However, for the sake of clarity, we shall henceforth use the term "shot"to mean a continuous sequence of frames after editing, so that neighboring frames in one shot show smooth transitions and small differences, whereas neighboring frames that cross shot boundaries are often characterized as having an abrupt discontinuity. The object of the rough matching (steps 312 and 322) now is to select, for each central shot, a best corresponding side shot, and label it appropriately. This can easily be done with customary technology in a regular editing room in any editing studio. The term "best corresponding" means that the best "take" for that shot has been chosen among all takes of this shot, and roughly cut to keep the matching frames, so that the side sequence that was selected needs minimal amount of processing to make it fit for three dimensional display. It is now required that the side shot be cut with at least 20 extra frames on each side, to allow proper fine matching of the shot, as will be explained below.

It is emphasized again that the center and side shots often originate from the same location and have been obtained consecutively. In this case it is preferable that care be taken that the corresponding shots match well. Although it is described herein how the processing apparatus should be constructed so that it can overcome any discrepancies between the center (main) and side (secondary) shots, it is clear to anyone skilled in image processing and cinema filming, that the better match there is during the shooting, the easier and less costly the processing will be, so that when there are scenes where the camera motion and other parameters can be suitably controlled to improve the original matching between the different shots, then it is advantageous to do so. However, when this is hard to achieve then the method and apparatus that is disclosed here can process and prepare non-matching shots to a degree suitable for display. This is most noticeable when the center and side shots have been obtained in different places—a room scene can have its side shots taken in another room for a variety of reasons, a desert scene can be shot with the center part in a studio and the side parts in a real desert and so on. Indeed, this is considered to be a central benefit of the system of the invention and the apparatus for the processing of the image sequences designed specifically to handle this requirement. The parameters for shooting coordination and processing requirements stem from the tradeoff between the difficulty of shooting and the difficulty of image processing. This tradeoff is dependent on the precise financial, technical and practical circumstances, as will be recognized by the skilled person, and different working configurations will be easily devised, for each case by a man skilled in the art, taking this trade-off into account.

After editing (step 302) has been completed, soundtrack can be added (step 303) to enhance the shot. If the central image sequence is not digitized, it can be converted to digital format (step 304). After rough matching (steps 312 and 322), fine matching of center and side shots (steps 313 and 323) is carried out, This is where the image processing software plays the major part. The final left and right sequences (steps 325 and 315, respectively) are completed.

Figure 11:
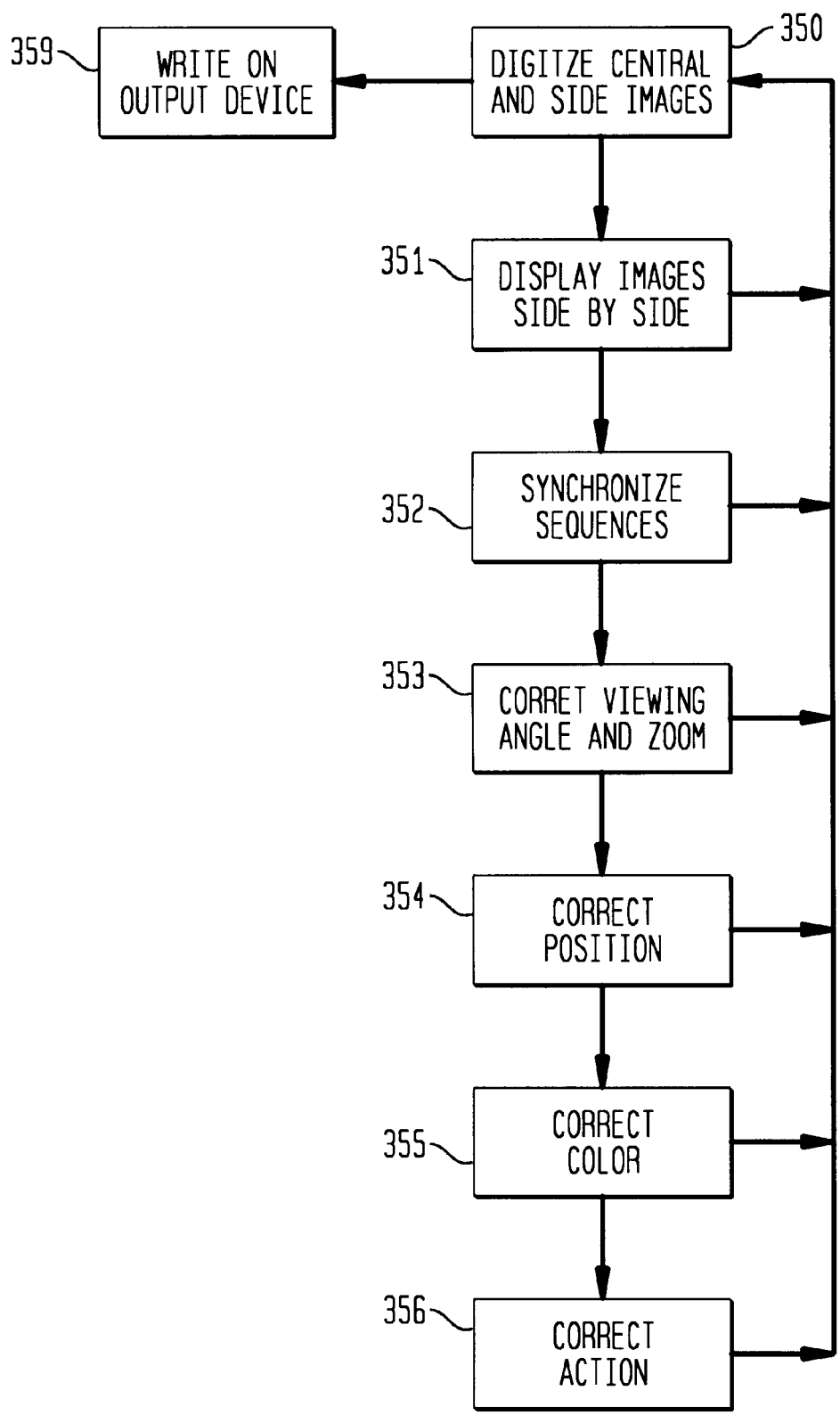
FIG. 11 is a flowchart which illustrates the fine matching step of secondary image sequences.

Reference will now be made to FIG. 11, to further discuss the procedures, according to one illustrative and non-limiting example of a processing according to the invention. First, the two sets of sequences are digitized (step 350) (if they are not already digital) and input to the computer where the processing is to take place. We are now in the position where two shots are input—in this example one center shot which will serve as a reference, and the other, in this example, a side shot which will be processed, where the side shot is already roughly matching to the center shot.

Figure 12:
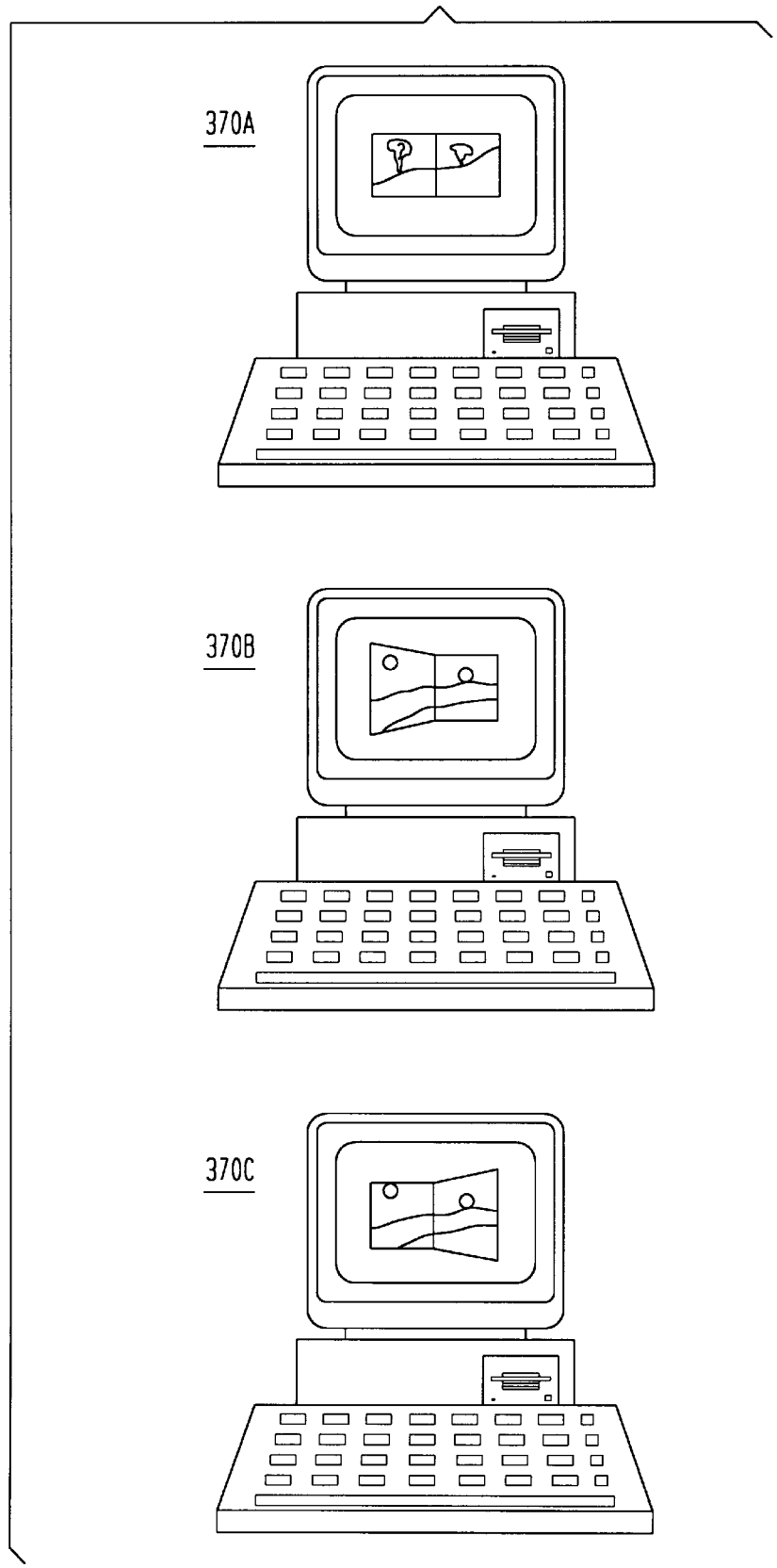
FIG. 12 is an example of possible display geometries.

The two sequences are now input (step 351) to the computer. It is important that the data is fully available to the processing apparatus, and so the images are input in uncompressed format. They are then presented side by side upon a screen, where they can be viewed in any desired or convenient way: frame by frame, as a real-time video, in any speed forward or backward, etc. Also, the geometry of the display on the window can be taken to be either regular rectangular, or else can be made to reflect the final geometry of the movie screen as viewed by an observer, as shown in FIG. 12, 370(*a*), 370(*b*), and 370(*c*). All this is in order to give the operator of the software (hereinafter referred to as "The editor") the best and most convenient tool possible to make sure that the edited sequence is fit to be displayed along the center sequence on a 3-d display as disclosed earlier. In the editing session, various tools are available to the editor in order to process and prepare the sequence. Often, the preferred mode of operation will include the application of one or more of the tools, reviewing of the result, and assessing the next stage, over and over again until the result is satisfactory. Then the edited sequence can be written to the output device—which can be any suitable device such as a video cassette, a hardware disc, or any suitable digital or analogue media.

The various image processing functions will now be further described. Step 352 indicates that a precise matching between frames of side and center sequences need to be marked. In particular, the precise starting frame of the shot and the end frame need to be marked. Also, intermediate frames need to be matched, since we cannot assume that the shots are synchronized. The spacing between synchronized frames is dependent on the two shots on the one hand and on the processing time allowed. As a rule of thumb, once every 20 to 30 frames is sufficient for all but very trembly or wobbly shots. The synchronization can be done visually or automatically. Both methods are similarly based on minimizing the optical disparity, that is, the way near objects hide far objects, This can easily be done visually by an operator, or automatically using widely known image processing tools, which allow automation at the risk of heavy and lengthy processing and a somewhat smaller than 100% success rate.

Once the frame matching is completed, the sequence can be updated. This sometimes involves determination of interpolated images. Usually we expect that shot lengths will not vary much. For example, we can expect a shot of 300 frames on the center sequence to require 310 frames on the side sequence. In such cases, it is usually preferable to avoid interpolation and to cut five frames from each side of the side shot. Without wishing to limit the invention in any way, the latter method is preferred since the eye is less sensitive to the static discrepancies between two frames than to the overall character of the sequence being presented in real time. Although interpolation methods for images are widely known and discussed in the relevant literature, this method is both costly and can involve a deterioration in image quality. Thus, it is preferably avoided unless the discrepancies between the shots are too great to ignore. In another preferred embodiment, optical flow techniques can be used to provide a Mathematical formula for the motion of each element of the image, hereby enabling interpolation of the images and the computation of what the image sequence should look like at any given time between any given frames.

Image processing function (step 353) involves correction of the viewing angle. As will be appreciated by a person skilled in this art, this involves application of a correction function which takes the form of a projective transformation. We therefore need to determine the eight parameters that the projective function requires, or, equivalently, we can determine the movement of four distinct points of the image. This can be done visually, with four (or more) control points and a pointing device such as a mouse; or else it could be done automatically by appropriate software. The software is designed in the following way. Usually the images have a common margin, usually covering about 10%–15% of their area. The program detects the common margin, and solves for the projective transformation that minimizes the discrepancies between this common part in both images. Preferably, this works by detecting numerous features in each image, matching the features between them so that at least four matches, but preferably 20 or more are obtained, and solving for the resulting transformnation, Again, there are tradeoffs between the manual or visual operation and the automatic one, where the benefit of automation is clear but invariably necessitates a high computational cost and a less than 100% chance of success. The application of this correction will be carried out on every frame, but the computation of the transformnation, just as in the previous function, need only to be carried out once every 10–30 frames, depending an the stability of the shot.

Of course, as will be appreciated by persons skilled in the art of image processing, other techniques beside projective transformation are useful in this step. Other families of functions can be useful for example, piecewise projective transformations, splines, and various polynomial and rational functions, each of which can be used for special or desired effects.

Image processing function (step 354) is only necessary in exceptional cases and efforts are usually made to carefully record the data to avoid this step. Distance differences between ideal coordinates of the camera when recording a given frame and its actual coordinates can usually be made sufficiently small by taking sufficient care in the planning and execution of the recording process, so as not to have to correct the position later (step 354). Also, it should be noted that electronic, or computerized, or virtual camera position correction even when applicable has clear theoretical limitations, as is entirely clear to anyone skilled in this art. For example, if an indoor scene is being taken and in it a table is photographed, then if the center camera position is above the table and is photographing the table top, and if the side camera has mistakenly been positioned slightly lower than the table top's height, there is no way of computing the tables' top image from the image of the table's lower parts using this technique of virtual camera repositioning. In such cases, step 356 in FIG. 11 needs to be used. Thus care should be exercised in planning and in carrying out the recording of the sequences to avoid costly and sometimes less than perfect computations.

If this correction is deemed necessary, then it is possible to carry it out in accordance with any known prior art method. Among the wide literature on the subjects of stereo vision, view synthesis, egomotion detection and correction, and related fields, reference is made, for the purposes of example only, to the paper "*What can Two images Tell Us About a Third One?*" by O. Faugeras and L. Robert, report no. 2018 of Institute National de Recherche en Informatique et en Automatique, which is herein incorporated by reference. In this article we find a clear explanation of how, given two images of the same scene, a new view of this scene can be computed. This approach can be utilized, for instance, in the following way. The two base images are two frames of the side sequence that we need to correct. They can be chosen as two neighboring frames or they can be taken to be further apart, where there are pros and cons for each case. Then, observing the side image as it appears on the computer monitor as explained above in step 350, the editor decides if he needs to virtually move his camera position up or down, left or right, forward or backward. Once he determines the position change, the algorithm as described in the above article can be used and the result observed. The final correction may be often achieved in stages, that is, start with a relatively large correction, and fine tune it until the result is satisfactory. Of course, the above procedure is different when different image sequences are recorded at different locations.

Full automation of this step can be achieved if used together with an egomtotion computation algorithm. This can determine the difference between the positions of the two cameras for each pair of images. As will be apparent to a person skilled in the art of stereo image analysis, a wide variety of algorithms of this nature are available. A discussion of one approach appears in "*Robust Recovery of Ego-Motion*", by M. Irani, B. Rousso and S. Peleg, which appeared in CAIP conference, Budapest 1993 and which is incorporated here by reference. The application of this correction to the full sequence can be time consuming but is nevertheless feasible.

The function of color correction (step 355) is relatively simple, and there are many ways to achieve it. One simple and useful way is to compute a 3×3 color correction matrix, so that the histogram of the center image and the side image will best match each other. Another way is to correct the color based on the common margin. This is a well known subject and does not need further discussion.

The last stage is the most interactive, and also the most powerful. In this stage we manually edit the sequence to achieve any effect desired, including effects that were not carried out by previous stages for any reason. Software like "Composer" sold by Alias-Wavefront corporation (Toronto, Ontario, Canada), is an illustrative and non-limiting example of one of several products that can be used for this purpose. Using such tools, the operator can add or delete objects to the sequence, animate cars or people, change color of hair or whatever effect that is desired. For example, if in a certain shot a car was parked by a sidewalk, and when the corresponding side sequence was recorded, that car is not parked there any longer, than it is a simple chore for such software (although laborious for its operator) to copy the car from the center sequence and paste it where it is desired to be seen in the side sequence, This stop gives us a measure of security that when other, more automated, or easier to handle tools prove insufficient—we can always rely on this basic tool to edit the image sequence to our needs.

While the invention has been described wit respect to a limited number of embodiments, it will be appreciated that many variations, modifications and other applications of the invention may be made.

I claim:

1. A method for displaying a composite, three-dimensional-like image sequence, by the assembly of two or more separate image sequences, comprising:

a) providing a main sequence of non-computer generated, real-life images previously recorded by a recording device during a first recording time and comprising a first number of image frames;

b) providing at least one secondary sequence of non-computer generated, real-life images having contents which are logically related to the contents of said main sequence but are not in precise visual correlation with said main sequence;

c) selecting the positioned relationship of said at least one secondary sequence and said main sequence;

d) processing said at least one secondary sequence to form digitized picture information representing said at least one secondary sequence;

e) transforming said digitized picture information by computer image processing to form at least one modified secondary sequence of images in increased visual correlation with said main sequence; said at least one modified secondary sequence comprising a second number of image frames, and said step of transforming including altering the number of said second number of image frames if said first number of image frames does not match said second number of image frames; and f) displaying said main sequence and said at least one modified secondary sequence at the same time and in substantially the same positioned relationship as selected in step (c) so as to form a seemingly continuous, correlated visual transition between said main sequence and said at least one modified secondary sequence.

2. The method of claim 1, wherein said second number of image frames is reduced if said first number of image frames does not match said second number of image frames.

3. The method of claim 1, wherein said second number of image frames is increased if said first number of image frames does not match said second number of image frames.

4. The method of claim 1, wherein transforming said digitized picture information includes scaling the sizes of images of said at least one modified secondary sequence so as to match the sizes of images of said main sequence.

5. The method of claim 1, wherein transforming said digitized picture information includes matching the movement of images of said at least one modified secondary sequence with the movement of images of said main sequence caused by the motion of the recording device.

6. The method of claim 1, wherein transforming said digitized picture information includes matching the colors and shades of images of said at least one modified secondary sequence with the colors and shades of images of said main sequence.

7. The method of claim 1, wherein said at least one secondary sequence is formed at a second time different than said first recording time.

8. The method of claim 1, wherein said main sequence is recorded at a first location and said at least one secondary sequence is recorded at a location different than the first location.

9. The method of claim 1, wherein the resolution of the images in said modified secondary sequence of images is lower than the resolution of the images in said main sequence.

10. The method of claim 1, further comprising recording said at least one secondary sequence of images prior to providing said at least one secondary sequence of images, said recording comprising displaying said main sequence to a cameraperson for visual guidance during the recording of said at least one secondary sequence of images to enable approximate matching of the movement of images of said at least one secondary sequence of images with the movement of images of said main sequence caused by the motion of the recording device.

11. The method of claim 1, wherein the display on which said main sequence is viewed is positioned centrally with respect to one or more displays on which said modified secondary sequence of images are viewed.

12. The method of claim 11, wherein the display on which said main sequence is viewed is positioned at an angle with the one or more displays on which said modified secondary sequence of images are viewed.

13. The method of claim 11, wherein the displays on which said modified secondary sequence of images are viewed are positioned beside the display on which said main sequence is viewed.

14. The method of claim 13, wherein additional displays on which said modified secondary sequence of images are viewed are positioned above and/or below the display in which the said main sequence is viewed.

* * * * *

UNITED STATES PATENT AND TRADEMARK OFFICE
CERTIFICATE OF CORRECTION

PATENT NO. : 5,963,247
DATED : October 5, 1999
INVENTOR(S) : Shmuel BANITT

It is certified that error appears in the above-identified patent and that said Letters Patent is hereby corrected as shown below:

Column 1, lines 38-39, "posychological" should read --psychological--.
Column 1, line 58, "geornetrical" should read --geometrical".
Column 2, line 17, "881" should read --861--.
Column 4, line 6, "some" should read --same--.
Column 4, line 20, "an" should read --on--.
Column 5, line 4, "likes" should read --like--.
Column 5, line 12, "inter-sect" should read --intersect--.
Column 5, line 63, "it" should read --its--.
Column 5, line 67, delete "is".
Column 8, line 19 "subroutine" should read --sub-routine--.
Column 11, line 7, "*warping*" should read --*Warping*--.
Column 11, line 12, "objects" should read --Objects--.
Column 11, line 58, "R" should read --it--.
Column 12, line 45, "invention" should read --Invention--.
Column 13, line17, "For photographic film camera is" should read --For example, a television camera can be--.
Column 13, line 18, "Attentively," should read --Alternatively,--.
Column 14, line 5, "Afternatively," should read --Alternatively,--.
Column 15, line 36, "some" should read --same--.
Column 16, line 15, "it" should read --its--.

UNITED STATES PATENT AND TRADEMARK OFFICE
CERTIFICATE OF CORRECTION

PATENT NO. : 5,963,247
DATED : October 5, 1999
INVENTOR(S) : Shmuel BANITT

It is certified that error appears in the above-identified patent and that said Letters Patent is hereby corrected as shown below:

Column17, line 8, "it" should read --its--.
Column 18, line 30, "The" should read --the--.
Column 20, line 66, "stop" should read --step--.
Column 21, line 3, "wit" should read --with--.

Signed and Sealed this

Twenty-third Day of May, 2000

Attest:

Q. TODD DICKINSON

*Attesting Officer*      *Director of Patents and Trademarks*